(12) United States Patent
Neville

(10) Patent No.: US 12,257,954 B2
(45) Date of Patent: *Mar. 25, 2025

(54) CARRIER ELEMENT

(71) Applicant: KELLY CARRIER, INC., Bellmore, NY (US)

(72) Inventor: Shawn Neville, Bellmore, NY (US)

(73) Assignee: Kelly Carrier, Inc., Bellmore, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/094,591

(22) Filed: Jan. 9, 2023

(65) Prior Publication Data

US 2023/0158967 A1   May 25, 2023

Related U.S. Application Data

(63) Continuation of application No. 16/362,212, filed on Mar. 22, 2019, now Pat. No. 11,560,100.

(60) Provisional application No. 62/647,298, filed on Mar. 23, 2018.

(51) Int. Cl.
*B60R 11/00* (2006.01)
*A61G 5/10* (2006.01)
*B60R 5/04* (2006.01)
*A61G 5/08* (2006.01)

(52) U.S. Cl.
CPC ............... *B60R 11/00* (2013.01); *A61G 5/10* (2013.01); *B60R 5/04* (2013.01); *A61G 5/08* (2013.01); *B60R 2011/0019* (2013.01); *B60R 2011/005* (2013.01); *B60R 2011/0075* (2013.01)

(58) Field of Classification Search
CPC ... B60R 11/00; B60R 5/04; B60R 2011/0019; B60R 2011/005; B60R 2011/0075
See application file for complete search history.

(56) References Cited

U.S. PATENT DOCUMENTS

| | | |
|---|---|---|
| 3,202,332 A | 8/1965 | Walker |
| 5,536,130 A | 7/1996 | Edensor |
| 6,216,867 B1 | 4/2001 | Haseltine et al. |
| 8,061,572 B2 | 11/2011 | Myrex |
| 2006/0027619 A1 | 2/2006 | Walther |

*Primary Examiner* — Corey N Skurdal
(74) *Attorney, Agent, or Firm* — Amster, Rothstein & Ebenstein LLP

(57) ABSTRACT

A carrier element is configured to securely store a foldable wheelchair that is mountable in an ambulette or other vehicle without interfering with passenger space in the vehicle.

14 Claims, 4 Drawing Sheets

CARRIER ELEMENT

CROSS-REFERENCE TO RELATED APPLICATIONS

The present application claims benefit of and priority to U.S. patent application Ser. No. 16/362,212 filed Mar. 22, 2019 which claims benefit of and priority to U.S. Provisional Patent Application Ser. No. 62/647,298 filed Mar. 23, 2018 and entitled CARRIER ELEMENT, the entire content of each of which is hereby incorporated by reference herein.

BACKGROUND

Field of the Disclosure

The present invention relates to a carrier element for accommodating a folding wheelchair in a vehicle. More specifically, the present application relates to a carrier element that is mounted in a vehicle to securely hold a folded wheelchair without interfering with passenger space.

Related Art

Ambulettes are vehicles, typically vans, that are commonly used to transport disabled, convalescing or otherwise mobility limited individuals in non-emergency situations. Ambulette use is increasing as the population ages. There are a variety of vehicles that are used as ambulettes, and each vehicle or vehicle type may offer different features or advantages. Despite this diversity and the fact that ambulettes are often used to transport disabled or mobility limited individuals, current ambulettes do not include any sort of carrier or other structure to allow for storage and transport of a foldable wheelchair without taking up or interfering with passenger space.

Accordingly, it would be desirable to provide a carrier element that resolves this and other problems.

SUMMARY

It is an object of the present disclosure to provide a carrier element configured to securely store a foldable wheelchair, where the carrier element is mountable in an ambulette or other vehicle without interfering with passenger space in the vehicle.

A carrier element in accordance with an embodiment of the present disclosure includes a base element; a pair of opposed sidewalls extending upward from the base element and connected by the base element; a pair of opposed end walls extending upward from the base element and connecting the based element and the opposed sidewalls; and a cavity defined by the base element, pair of opposed sidewalls and pair of opposed end walls, wherein the cavity is dimensioned to receive a folded wheelchair.

A carrier element in accordance with an embodiment of the present disclosure includes a base element; a first sidewall extending upward from the base element on a left side thereof; a second sidewall extending upward from the base element on a right side thereof; a rear end wall extending upward from the base element at a rear end thereof and connecting the base element, first sidewall and second sidewall; and a front end wall extending upward from the base element at a front end thereof and connecting the base element, first sidewall and second sidewall; wherein a cavity is defined by the base element, first sidewall, second sidewall rear end wall and front end wall and is dimensioned to accommodate a folded wheelchair.

Other features and advantages of the present invention will become apparent from the following description of the invention which refers to the accompanying drawings.

BRIEF DESCRIPTION OF THE DRAWINGS

The above and related objects, features and advantages of the present disclosure will be more fully understood by reference to the following, detailed description of the preferred, albeit illustrative, embodiment of the present invention when taken in conjunction with the accompanying figures, wherein.

DETAILED DESCRIPTION OF THE EXEMPLARY EMBODIMENTS

Figure 1:
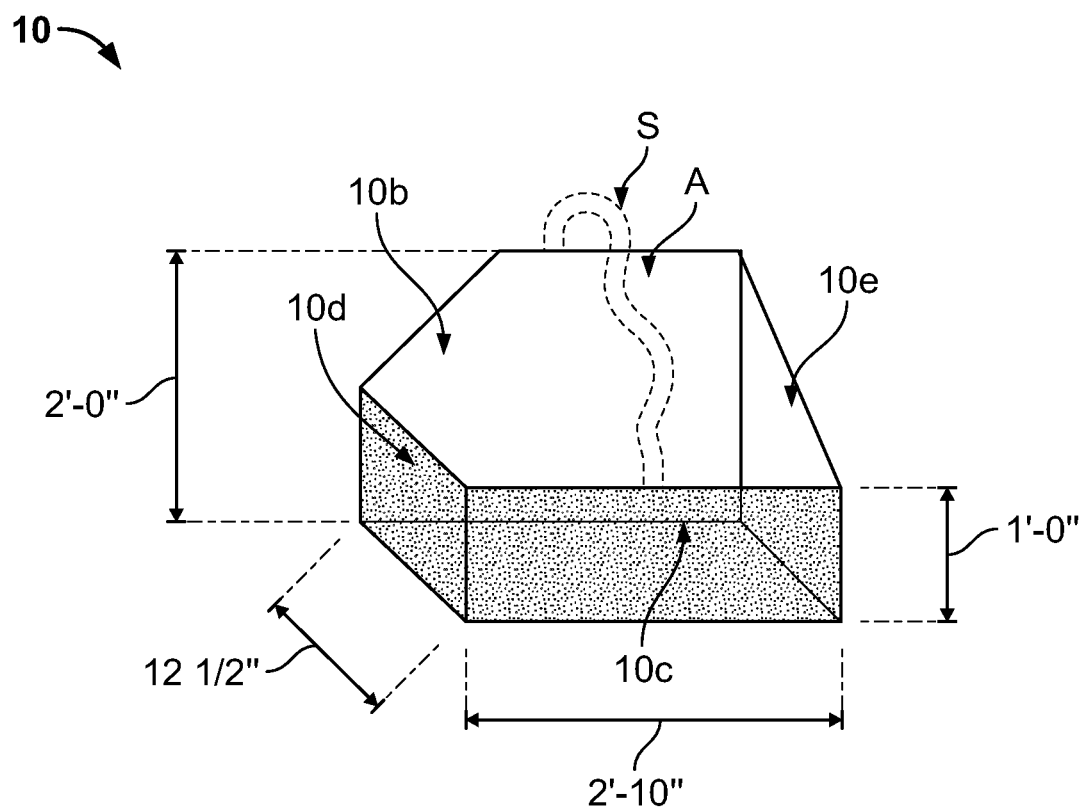
FIG. 1 is side view of an exemplary illustration of a carrier element in accordance with an embodiment of the present disclosure.

FIG. 1 illustrates a carrier element 10 in accordance with an embodiment of the present disclosure. As illustrated, in embodiments, the carrier element 10 includes a bottom plate 10a and a pair of opposed sidewalls 10b, 10c extending upward from the bottom plate 10a on the left and right sides thereof. In embodiments, the bottom plate 10a may be rectangular in shape. In embodiments, a pair of opposed end walls 10d, 10e extend upward from the bottom plate 10a and connect the opposed sidewalls 10b, 10c. In embodiments, the bottom plate 10a, sidewalls 10b, 10c and endwalls 10d, 10e define a storage area A in which a folded wheelchair may be secured. In embodiments, the carrier element 10 may include legs 12a, 12b (see FIG. 3) connected to the bottom plate 10a. In embodiments, the legs 12a, 12b are provided on the left side of the bottom plate 10a and extend downward to the floor of the vehicle, which, as noted above, is preferably an ambulette.

Figure 2:
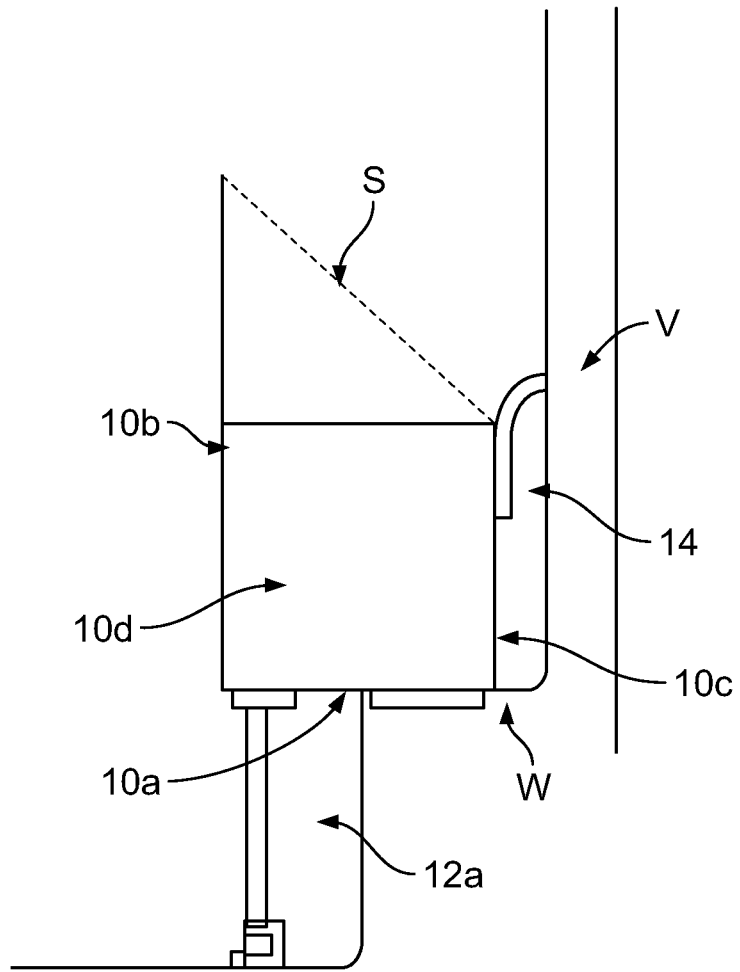
FIG. 2 is an exemplary end view of the carrier element of FIG. 1.

As can be seen in FIG. 2, in embodiments, the carrier 10 is preferably mounted such that the right side of the carrier element is positioned above the wheel well W of the ambulette. In embodiments, the carrier element may not be mounted above the wheel well W. In embodiments the left side of the carrier element 10 may be mounted over the wheel well W. In embodiments, the additional legs may be similar in structure to the legs 12a and 12b and may be provided on the right side of the carrier 10 as well. In embodiments, these additional legs may extend from the bottom plate 10a to the top of the wheel well W, or to the floor of the ambulette in front of or behind the wheel well. In embodiments, the left side of the carrier 10 is preferably supported by the legs 12a, 12b. While two legs 12a, 12b are illustrated, in embodiments, a single leg or additional legs may be provided to support the left side of the carrier element.

Figure 3:
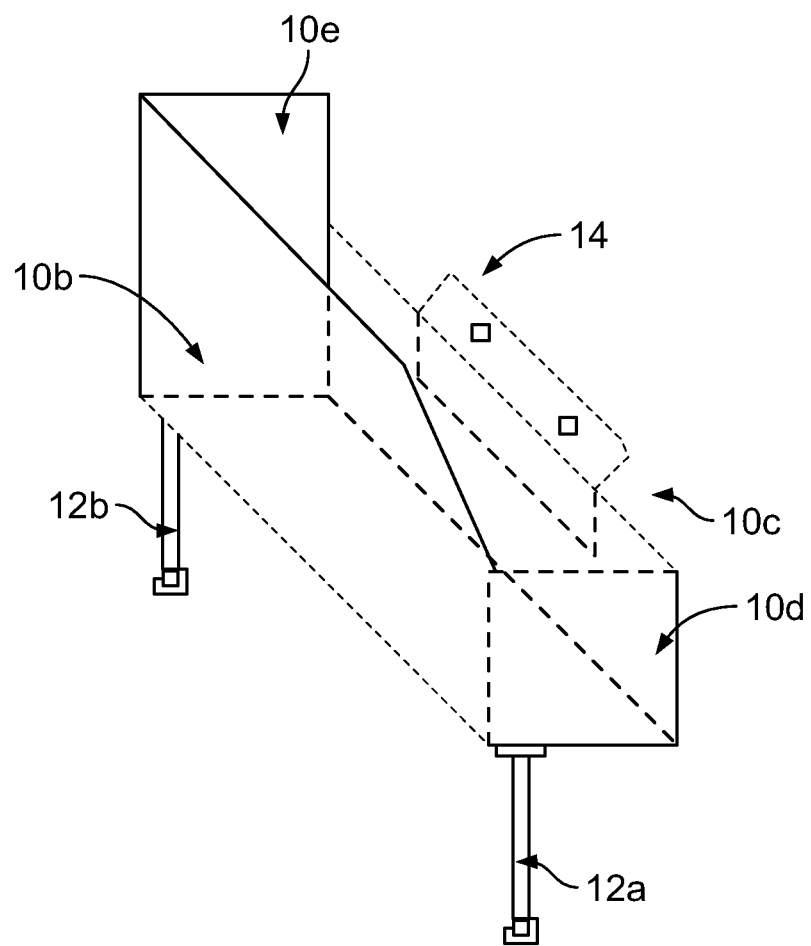
FIG. 3 is an exemplary perspective view of the carrier element of FIG. 1.

In a preferred embodiment, the left sidewall 10b preferably extends higher than the right sidewall 10c. As can be seen with respect to FIG. 2, in embodiments, the right sidewall 10c is preferably positioned adjacent to a wall V of the ambulette and the wall V of the ambulette helps to secure the folded wheelchair in the carrier 10. In embodiments, the left sidewall 10b may be the same height as the right sidewall 10c. In embodiments, the height of the left sidewall may angle downward toward the front end wall 10d as can be seen in FIG. 3. In embodiments, this sloped portion provides easier access to the wheelchair when stored in the cavity A of the carrier 10. In embodiments, a mounting plate or bracket 14 may be connected to the sidewall 10c such that the carrier element 10 may be secured to the wall V of the ambulette. Ambulettes commonly include a bracket along the wall V that allows for the carrier element 10 to be connected to the wall V via the steel plate 14.

In embodiments, the right side of the carrier 10 may be supported by the mounting plate 14 which is secured to the wall V. As a result, the carrier element 10 of the present disclosure may be used in virtually any existing ambulette. In embodiments, the mounting plate 14 may be welded to the sidewall 10c and bolted to the wall V. In embodiments, the mounting plate 14 may be secured to the sidewall 10c in any desired manner provided that it is sufficiently strong to meet safety requirements.

In embodiments, the left sidewall 10b may be positioned opposite the wall V of the ambulette and faces the passenger area of the ambulette. As noted above, this wall 10b may be higher than the wall 10c which is beneficial since this side of the carrier element 10 is exposed to the open passenger area of the ambulette.

In embodiments, the carrier element 10 may also include a strap S that is connected between the sidewalls 10b, 10c. In embodiments, the strap S may be used to hold a folded wheelchair in place when it is placed in the carrier element 10. In embodiments, the strap S may be adjustable such that it can be tightened as necessary to secure a wheelchair in the carrier element 10.

In embodiments, the carrier element 10 is made of 18-gauge steel. In embodiments other materials may be used, provided that they comply with safety standards and minimum strength requirements. In addition, in embodiments, all of the exposed edges of the carrier element 10 may processed to avoid sharp edges and thus reduce the risk of injury. In embodiments, the exposed edges may be covered to avoid injury.

Figure 4:
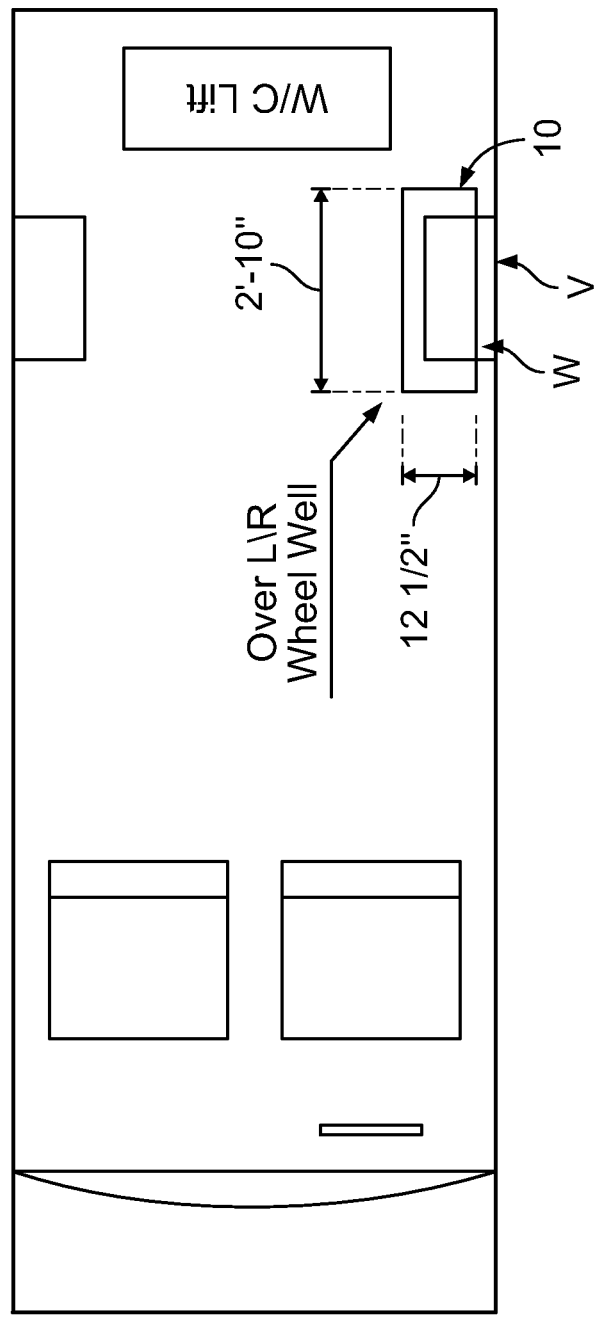
FIG. 4 is an exemplary illustration of the floorplan of an ambulette interior illustrating a preferred position of the carrier element.

FIGS. 1 and 4 illustrate preferred dimensions for the carrier element 10 including the sidewalls 10b, 10c and end walls 10d, 10e. While these dimensions are preferred, the dimensions of the carrier element 10 may vary from these dimensions provided that there is sufficient space between the sidewalls 10b, 10c and end walls 10d, 10e to securely store a folded wheelchair without interfering with passenger space.

Although the present invention has been described in relation to particular embodiments thereof, many other variations and modifications and other uses will become apparent to those skilled in the art.

What is claimed is:

1. A carrier element comprises:
a base element;
a pair of opposed sidewalls extending upward from the base element and connected by the base element, wherein a first sidewall, across the entire width thereof, is shorter than a second sidewall positioned opposite the first sidewall; and
the second sidewall angles downward toward a front end thereof;
a pair of opposed end walls extending upward from the base element and connecting the base element and the opposed sidewalls; and
a cavity defined by the base element, pair of opposed sidewalls and pair of opposed end walls, wherein the cavity is dimensioned to receive a folded wheelchair.

2. The carrier element of claim 1, wherein a front end wall of the pair of opposed end walls is lower than a rear end wall.

3. The carrier element of claim 1, further comprising a first pair of legs extending downward from the base element on a first side of the carrier element.

4. The carrier element of claim 1, further comprising a second pair of legs extending downward from the base element on a second side of the carrier element, opposite the first side of the carrier element.

5. The carrier element of claim 1, further comprising a strap element extending between the pair of opposed sidewalls.

6. The carrier element of claim 5, wherein a length of the strap is adjustable.

7. The carrier element of claim 1, further comprising a bracket element, attached to a first sidewall of the pair of opposed sidewalls and configured to secure the carrier to a wall of a vehicle.

8. A carrier element comprising:
a base element;
a first sidewall extending upward from the base element on a left side thereof;
a second sidewall extending upward from the base element on a right side thereof,
wherein the first sidewall is higher than the second sidewall and the second sidewall angles downward toward a front end wall;
a rear end wall extending upward from the base element at a rear end thereof and connecting the base element, first sidewall and second sidewall; and
a front end wall extending upward from the base element at the front end thereof and connecting the base element, first sidewall and second sidewall;
wherein a cavity is defined by the base element, first sidewall, second sidewall rear end wall and front end wall and is dimensioned to accommodate a folded wheelchair.

9. The carrier element of claim 8, wherein the front end wall is lower than the rear end wall.

10. The carrier element of claim 8, further comprising a first pair of legs extending downward from the base element on a first side of the carrier element.

11. The carrier element of claim 8, further comprising a second pair of legs extending downward from the base element on a second side of the carrier element, opposite the first side of the carrier element.

12. The carrier of claim 8, further comprising a strap element extending between the first sidewall and the second sidewall.

13. The carrier of claim 12, wherein a length of the strap is adjustable.

14. The carrier of claim 8, further comprising a bracket element, attached to the first sidewall and configured to secure the carrier to a wall of a vehicle.

* * * * *